US009959711B2

(12) United States Patent
Kennedy

(10) Patent No.: US 9,959,711 B2
(45) Date of Patent: May 1, 2018

(54) METHOD FOR INTEGRATING GAMES WITH DIGITAL MEDIA

(71) Applicant: Scientific Games International, Inc., Newark, DE (US)

(72) Inventor: James C. Kennedy, Roswell, GA (US)

(73) Assignee: Scientific Games International, Inc., Newark, DE (US)

(*) Notice: Subject to any disclaimer, the term of this patent is extended or adjusted under 35 U.S.C. 154(b) by 290 days.

(21) Appl. No.: 14/283,265

(22) Filed: May 21, 2014

(65) Prior Publication Data
US 2015/0339877 A1 Nov. 26, 2015

(51) Int. Cl.
| G07F 17/00 | (2006.01) |
| G07F 17/32 | (2006.01) |
| G06Q 50/34 | (2012.01) |
| G06Q 20/12 | (2012.01) |
| G06Q 20/18 | (2012.01) |

(52) U.S. Cl.
CPC ......... *G07F 17/329* (2013.01); *G06Q 20/123* (2013.01); *G06Q 20/18* (2013.01); *G06Q 50/34* (2013.01); *G07F 17/32* (2013.01); *G07F 17/3244* (2013.01)

(58) Field of Classification Search
CPC ....................................................... A63F 9/24
See application file for complete search history.

(56) References Cited

U.S. PATENT DOCUMENTS

| 7,108,171 | B1* | 9/2006 | Ergo | G06Q 30/02 235/375 |
| 7,264,546 | B2 | 9/2007 | Marshall et al. | |
| 7,909,326 | B2 | 3/2011 | Walker et al. | |
| 8,715,077 | B2 | 5/2014 | Paradise et al. | |
| 2001/0034635 | A1* | 10/2001 | Winters | G06Q 30/02 705/14.33 |
| 2007/0006708 | A1* | 1/2007 | Laakso | G07F 17/32 84/1 |
| 2007/0105625 | A1* | 5/2007 | Walker | G07F 17/3223 463/30 |
| 2008/0113733 | A1 | 5/2008 | Kushner | |
| 2009/0037263 | A1 | 2/2009 | Patil | |

(Continued)

OTHER PUBLICATIONS

PCTSearch Report, dated Aug. 19, 2015.

*Primary Examiner* — Tramar Harper
*Assistant Examiner* — Jeffrey Wong
(74) *Attorney, Agent, or Firm* — Dority & Manning, P.A.

(57) ABSTRACT

A method for integrating game products with sale and dissemination of digital media to players includes providing for players to purchase digital media for download at a purchase price that enters the player into a game wherein the player's downloaded digital media determines whether or not the player has won in the game. The purchased downloads are downloaded from a library, wherein a number of the digital media are stored in the library in their original format, and a defined number of the digital media stored in the library are modified from their original format to include an auditory or visual indication of a winning lottery play. The players download and listen to or view their downloaded digital media to determine if they have purchased a winning digital media in the lottery game. Players losing in the lottery game may be provided a downloaded digital media in its original format.

18 Claims, 5 Drawing Sheets

(56) References Cited

U.S. PATENT DOCUMENTS

| | | | | |
|---|---|---|---|---|
| 2009/0117968 A1* | 5/2009 | Krietemeyer | ........ | G07F 17/3258 |
| | | | | 463/18 |
| 2011/0281642 A1* | 11/2011 | Hardy | ................. | G07F 17/3262 |
| | | | | 463/25 |
| 2011/0302041 A1* | 12/2011 | Dance | ................ | G06Q 30/0601 |
| | | | | 705/26.1 |
| 2012/0178514 A1 | 7/2012 | Schulzke et al. | | |
| 2012/0265604 A1* | 10/2012 | Corner | ................... | G06Q 30/02 |
| | | | | 705/14.39 |
| 2013/0040738 A1 | 2/2013 | Mikkelsen et al. | | |
| 2013/0324207 A1* | 12/2013 | Stanek | ................. | G07F 17/329 |
| | | | | 463/17 |
| 2014/0315614 A1* | 10/2014 | Granich | ............. | G07F 17/3209 |
| | | | | 463/17 |
| 2014/0315644 A1* | 10/2014 | Itakura | .................... | A63F 13/35 |
| | | | | 463/42 |
| 2015/0120535 A1* | 4/2015 | Evans | ..................... | H04L 65/60 |
| | | | | 705/39 |

\* cited by examiner

METHOD FOR INTEGRATING GAMES WITH DIGITAL MEDIA

BACKGROUND

The gaming industry, including casino-based games, Internet-based gaming sites, and lottery-based games, is growing as a source of consumer entertainment and revenue generation for local jurisdictions. Lottery games in particular have become a time honored method of raising revenue for state and federal governments the world over. Traditional scratch-off and on-line games have evolved over decades, supplying increasing revenue year after year. However, the lottery industry must continuously evolve with changes in technology, player preferences, and so forth, to introduce new and entertaining games in order to sustain or increase the revenue stream. For example, as the Internet has grown into a daily household means of communication, information source, entertainment, and the like, various examples of Internet-enabled lottery games have been proposed, including multi-player games. For example, published U.S. patent application Ser. No. 13/223,628 entitled Method for Implementing a Digital Gate Enabled Multi-Player Lottery Game describes an Internet-enabled lottery game wherein players are provided lottery tickets that include a code for entry into a multi-player network via the Internet, the plurality of players combining their respective entries to complete a multi-player game, such as a puzzle. Upon successful conclusion of the multi-player game, the consumers are awarded a prize.

The Internet has also greatly enhanced the availability and ease of providing digital media to the consuming public, such digital media including, for example, music, movies, videos, video games, and the like. Consumers can shop for and download movies/videos, games, and music/songs from any number of well-known websites offering such services. Even big-box retailers are now offering music and video downloads to customers via the Internet. As the character and nature of digital medial dissemination changes and grows, the gaming industry is presented with a prime opportunity for growth by integrating game products with the sale and dissemination of such digital media.

Accordingly, the gaming industry would welcome a method for offering game products in a new and entertaining way to a broad base of potential players via integration of such products with the sale and dissemination of conventional digital media.

SUMMARY OF THE INVENTION

Objects and advantages of the invention will be set forth in part in the following description, or may be obvious from the description, or may be learned through practice of the invention.

In accordance with aspects of the invention, a method is provided for integrating game products with the sale and dissemination of digital media to players. The invention is not limited to any particular type of digital media, and may include, for example, downloadable songs, videos, movies, video games, software applications ("apps"), and any other type of digital compositions or works that are generally made available to the public for personal use and enjoyment through various websites.

The term "video" is used herein in a generic sense to include any type of downloadable movie, video segment, video game, or any other type of visual digital media. "Video" includes the accompanying soundtrack or musical score of the movie, video segment, video game, and so forth.

The term "song" is used herein in a generic sense to include any type of musical composition or score, with or without lyrics.

It should also be appreciated that the invention is not limited to any particular gaming environment, and may have usefulness in casino-based games, Internet-based gaming sites, lottery-based games, and the like. Aspects of the present invention will be explained herein with reference to lottery games for purposes of illustration only, and not as a limitation of the invention.

Continuing, for a lottery game environment, the present method includes providing for players to purchase digital media for download at a purchase price. This step may be accomplished, for example, via a website hosted by a lottery authority (which includes a website authorized by a lottery authority and maintained by a separate entity, such as a lottery service or game provider). The purchase price for the digital media entitles the player to entry into a lottery game wherein the player's downloaded digital media may be considered as a "game piece" that determines whether or not the player has won in the lottery game.

The game provider maintains a library of the digital media from which the purchased downloads are obtained and transmitted to the players. For example, if the digital media is downloadable songs, the library contains numerous copies of each song offered for purchase by the players. The game provider determines the number of songs, purchase price to players, odds of winning, and so forth, to achieve a desired expected value (EV) for the game. The game provider obtains the requisite number of digital media from the owner of the media or an authorized sales/distribution organization that has rights to sell the digital media to the game provider, including any permission or rights needed for the game provider to create derivative works by modifying the digital media.

Preferably, the purchase price of the digital media to the player includes the cost of the digital media to the game provider, as well as a component that is used to fund and achieve the EV for the game. These aspects of the present game may be analogized to a run of instant lottery tickets wherein the game provider provides a run of X number of tickets for sale to the public at a price Y to achieve an expected value of, for example, 50% for the game. A predetermined number of the instant lottery tickets are winning tickets at a predetermined payout to achieve the expected value for the run of tickets.

The game provider modifies a defined number of the digital media in the library to have an auditory or visual indication of a winning lottery play placed in the original format of the digital media. This "modifying" step may vary widely within the scope and spirit of the invention, as discussed in more detail below, but in general is the step that flags certain of the digital media as winning game pieces. In a particularly unique embodiment, only the predetermined number of winning digital media are modified, and the losing game pieces (digital media) are not modified and remain in their original format. Thus, with this embodiment, players purchasing a losing game play are provided the downloaded digital media in its "clean" original format for their use and enjoyment.

In an alternate embodiment, the digital media in the library constituting losing game pieces may also be modified to include a visual or auditory indication of a losing game play.

It should be understood that the term "original format" is used herein to encompass the various digital formats (e.g., mp3, WAV formats, etc.) of the media pieces that are made available to the public via non-lottery sources, for example the various digital formats of a song or video that may be purchased from i-Tunes™ or Wal-Mart™. This "original format" includes the original auditory and/or visual presentation of the digital media in any of the conventional digital formats—the sound and video that is presented when the digital media is played. For example, a digitally downloaded song has an original auditory format in the context of the present invention regardless of its digital format (e.g., mp3 or WAV format).

At a time of their choosing after downloading their purchased digital media, the player listens to or views the piece to determine if they have purchased a winning digital media (game piece) in the lottery game. During play of the digital media, the modification made to the original format of the piece provides an auditory or visual indication that the digital media is a winning game piece. For example, in a song, the lyrics may have been changed or altered to say "Congratulations, you are a winner in the Lottery Game", or a scene or soundtrack in a video may be altered to provide a visual and/or auditory indication of the winning status of the game piece.

Aspects of the present invention may also apply to downloadable video games, e.g., games that are downloaded to a mobile device for free or by purchase. Players may purchase a modified version of video game, wherein the original format of the soundtrack or visual composition of the video game may be modified so as to present an evolving game theme that develops over the course of the game and culminates in a final win/loss indication to the player at or near the end of the video. In addition to or alternatively, upgrades to the video game that are typically purchased by the player may be modified in accordance with the aspects discussed herein, wherein the upgrade contains the game reveal. The player may be offered the option to purchase an "unmodified" upgrade at the normal price, or a lottery/game upgrade for an additional premium price, wherein the lottery/game upgrade also includes the potential for the player to win a prize that is revealed in the upgrade. An example of such an upgrade may be the "power up" option purchased by players of the popular Candy Crush Saga mobile device game.

In other aspects, the present invention includes a digital media-based award system for use in gaming. This award system may have utility in numerous gaming environments, and is not limited to lottery games. For example, the digital media-based award system may be utilized in any scenario wherein prizes or awards are given in a game of chance or skill. The digital media may be a component of the game, such as the lottery game pieces described above, or may be the prize associated with another game, such as a raffle, slot machine award, any type of game wherein players earn credits and trade such credits for a prize, including second chance games. Such games may require the player to pay an additional price for the chance of obtaining a winning status digital media, or the price may be built into the original game in which credits or points were earned to "purchase" the digital media.

In an exemplary embodiment of the system, a library of the digital media is provided, with the digital media having an original format. A defined number of the digital media in the library are modified to have an auditory or visual indication of a winning status placed in the original format of the digital media. Each of the winning status digital media has a respective prize award associated therewith. With this system, players in a game download and listen to or view a select one of the digital media to determine if the downloaded digital media is a winning digital media.

The library of digital media may be downloadable music/songs, with the winning status indication including a modification to words or musical composition of the original format of the music/song. In an alternate system embodiment the library of digital media are downloadable videos, with the winning status indication including a modification to the soundtrack or visual composition of the original format of the video. The downloadable videos may be video games, wherein an event in the video game is modified from its original format to provide the winning status indication.

In an alternate system embodiment, a separately produced segment that contains the auditory or visual indication is embedded into the original format of the digital media. For example, this segment may interrupt lyrics to a song or a scene in a video of the digital media.

The system may also include a second library or compilation of additional digital media downloads corresponding to the winning status digital media in their original respective format. With this configuration, players in the game may be provided the additional digital media upon redemption of the winning status digital media.

In one embodiment, the system may be implemented with a computer-implemented website wherein players access the website via a network enabled device, the website offering to the players the digital media for download at a purchase price.

In another embodiment, the system may be implemented by a plurality of kiosks or terminals networked with a central game computer and configured for players to purchase the digital media downloads at a point of sale retail location.

Each digital media in the library modified with a winning status indication may also be provided with a unique code or serial number that may be used for a variety of purposes, including inventory control, verification of authentic digital media, redemption, and so forth.

The digital media modified with a winning status indication may be randomly distributed throughout the library of digital media. In an alternate embodiment, the digital media modified with a winning status indication may be distributed in a defined order in the library of digital media, wherein the media are randomly selected from the defined order for download.

Additional aspects of the invention are discussed below with reference to various embodiments set forth in the figures.

BRIEF DESCRIPTION OF THE DRAWINGS

A full and enabling disclosure of the present subject matter, including the best mode thereof, directed to one of ordinary skill in the art, is set forth in the specification, which makes reference to various embodiments in the appended figures, in which.

DETAILED DESCRIPTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Figure 1:
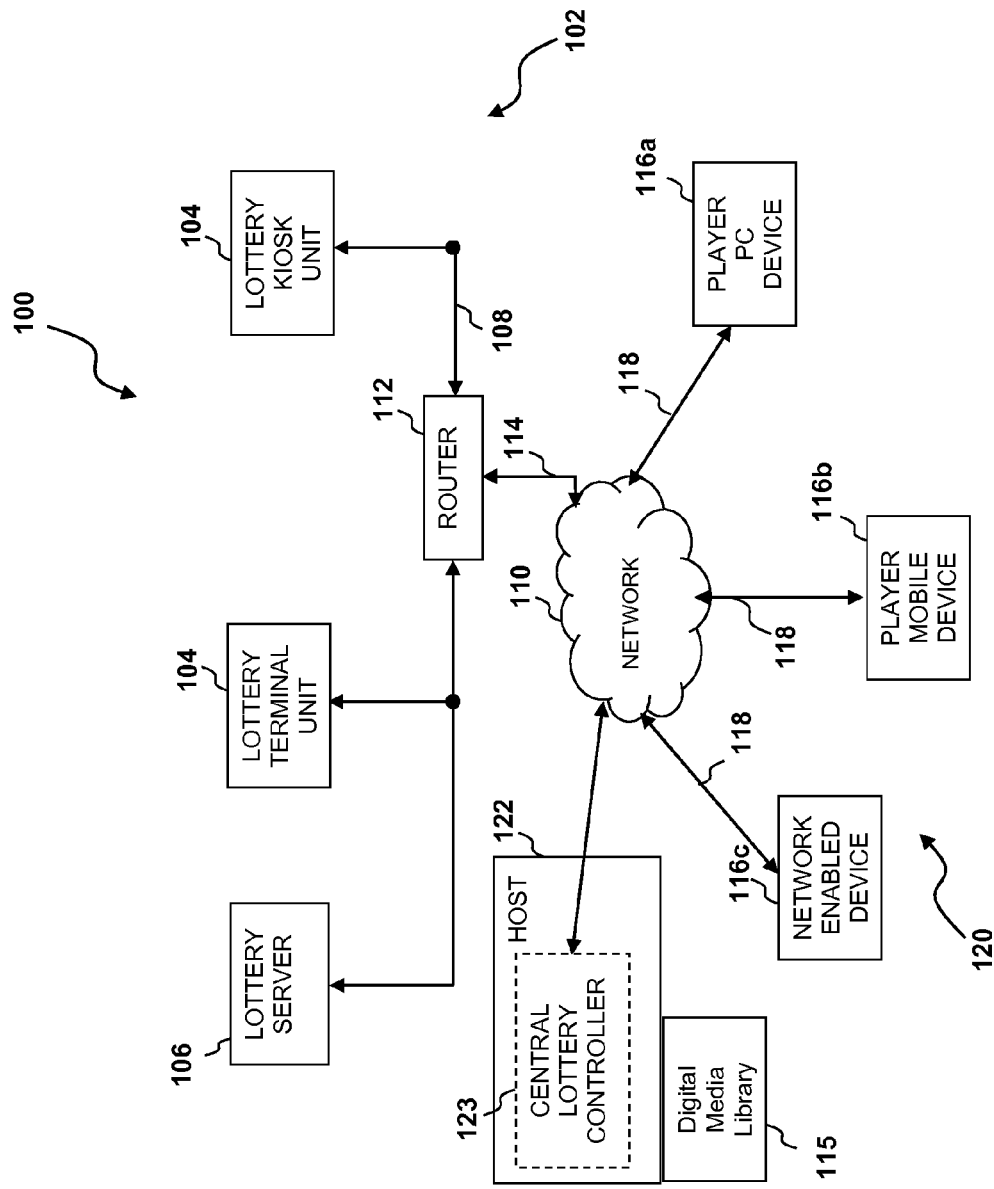
FIG. 1 is a schematic view of an exemplary gaming system that may be used to implement various method embodiments in accordance with aspects of the present invention.

FIG. 1 is a diagram view of a representative computer-enabled system 100 that may be used to practice aspects of the digital media game or system in accordance with aspects of the invention. The system in FIG. 1 (as well as the remaining figures) is in reference to a lottery game embodiment of the invention. As mentioned, this is for illustrative purposes only, and the invention is not limited to lottery-based games, but may be implemented in any gaming environment wherein players are presented with the opportunity to purchase digital media as a component of the game, or where the digital media are prizes in an unrelated game, and so forth. It should further be appreciated that the invention is not limited to the configuration of FIG. 1, and that any number of software and hardware configurations between numerous entities may be provided for practice of the invention.

Referring again to FIG. 1, the exemplary system 100 includes a central system administered by the game provider, which may be a central lottery system hosted by a lottery game provider. The system 100 includes a host computer 122 with a central controller 123 for controlling aspects of the lottery or gaming system. It should be readily appreciated that the central controller may include an integrated server, or the host computer 122 may include any manner of periphery server or other hardware structure. The host computer 122 is configured to carry out the gaming functions associated with the digital media games described herein.

The central system host computer 122 may be a single networked computer, or a series of interconnected computers having access to the network 110 via a gateway or other known networking system. Generally, the central host computer 122 may include a central controller 123 configured to manage, execute and control individual terminal units or kiosks 104 for various purposes related to the digital media game, such as purchase and download of digital media to a storage device presented by a player, redemption of prizes associated with winning digital media, and so forth. The central controller 116 may also be interfaced with various types of network enabled devices 116 (e.g., smart phones, PC's, personal assistant devices, and so forth) for purchase and download of the digital media directly to players. The central controller 123 may include a memory for storing gam-related procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The central controller 123 may be directly or indirectly connected to a storage device 115 that contains the digital media, such as a library of downloadable songs or videos properly obtained from owners or authorized sources of the digital media.

The central controller 123 may be directly or indirectly connected through the I/O bus to any manner of peripheral devices such as storage devices, wireless adaptors, printers, and the like. In addition, a database (DB) may be communicatively connected to the central controller 123 and provide a data repository for the storage and correlation of information gathered from the individual terminal units or kiosks 104, devices 116 or nodes 120. The information stored within the database may be information relating to individual players, games, or digital media specific information, such as access codes or numbers assigned to winning and/or digital media.

The players may interface directly with the central lottery system 122. For example, the players may be provided with a link for accessing the central system directly via a network enabled device (for example, an Internet enabled PC or mobile device). For download of the digital media and play of the games, the player may be directed to download software to their PC or other network-enabled device that enables the player to perform all functions needed to purchase and download the digital. In this regard, the network 100 may be configured for interacting with any manner of network enabled device used by players, such as the PC 116a, a mobile network enabled device 116b (such as a PDA or cellular phone), or any other type of remote network enabled device 116c, as depicted in FIG. 1. These other network enabled devices 116 may be directly connected to the network 110 through a plurality of direct network links 118, thereby eliminating the need for the bus, router, or other networking equipment.

It should also be appreciated that each of the network enabled devices 116 in this configuration may represent a lottery node 120 corresponding to a state or other jurisdictional lottery system operating within an individual state or region of states. The lottery nodes 120, in turn, may be directly connected and/or multiplexed to the network 110 via the direct network links 118. Further, the direct network links 118 may represent secure communications channels physically hardened against tampering and/or the communications may be encrypted to prevent unauthorized access to information transmitted thereon.

The players may be pre-screened to ensure that they satisfy jurisdictional legal requirements of a lottery game, including Internet-based games. These players may have an established profile or account and be provided with a registration number or code that must be entered upon accessing the website link. In certain embodiments, the players may place their wager directly with the central system via their network enabled device, for example through an established player account.

In an alternate embodiment depicted within FIG. 1, the gaming system 100 may be implemented by a network layout 102 within a given establishment authorized by the state or other jurisdiction to conduct the games, such as a bar/grill, restaurant, gaming house, casino, and so forth. In this alternate configuration, a plurality of terminal or kiosk units 104 may be provided to patrons as interactive terminals wherein the players can access the central lottery system 122, and purchase and download the digital media to a personal storage device, such as a flash drive. These terminals or kiosks 104 may be dedicated solely to the digital media game, or may also be configured for sale of other lottery products, such as online game tickets, instant scratch-off tickets, and the like. Terminal units 104 may be distributed throughout a single establishment and connected with a LAN, such as game terminals in a casino, or throughout multiple sites and connected with a WAN. Further, the LAN and/or WAN connecting each of the terminal units 104 may include one or more separate and secure buses 108, routers 112, web servers 106, gateways and other networking equipment to provide continuous and/or redundant connectivity to the network 110. As discussed above, the network 110 may be communicatively connected to central host computers 122 and/or respective central controllers as well as associated databases to allow for implementation, storage, tracking and analysis of gaming and other features.

The terminal or kiosk units 104 may be configured with any manner of hardware and software functionality to accept a player's request for purchase and download of digital media.

It should be appreciated the terms "terminal or kiosk" are used herein in a generic sense to include any machine wherein players interface for play of a game wherein downloaded digital media are game pieces. For example, slot machine in a casino that is configured to download digital media as part of a game reward, is considered as a terminal or kiosk for purposes of the present disclosure.

The terminal or kiosk units 104 may also be configured for redeeming a winning digital media by reading and recognizing a code or serial number embedded in the digital media, wherein the code or serial number correlates to a winning digital media game piece stored in a database accessible by the central controller 123. The terminals 104 may issue a credit slip that the player uses to collect their prize award at the establishment's cashier or an authorized lottery redemption center.

Figure 2A:
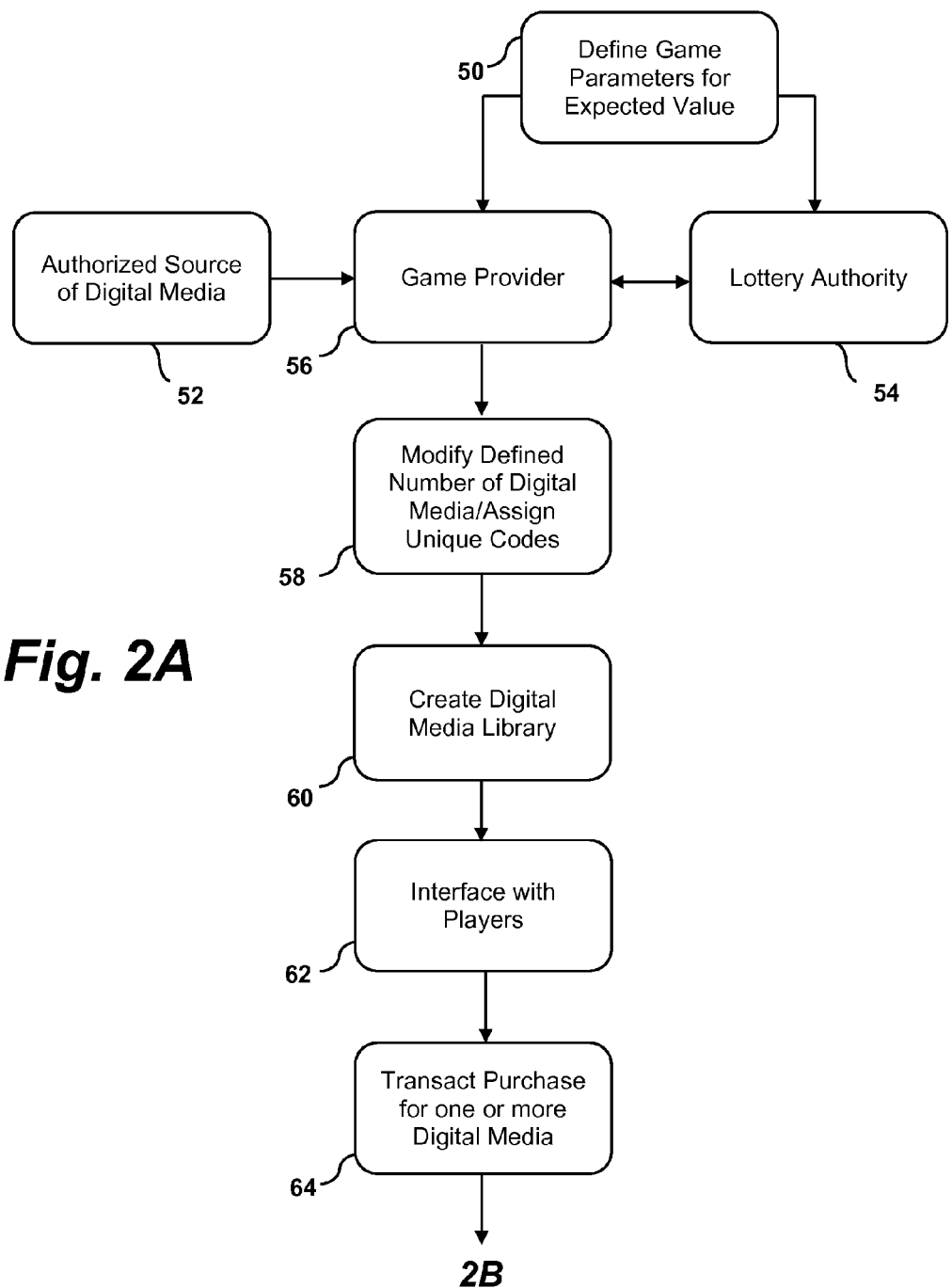
FIG. 2A is a flow diagram of certain aspects of the present method.
Figure 2B:
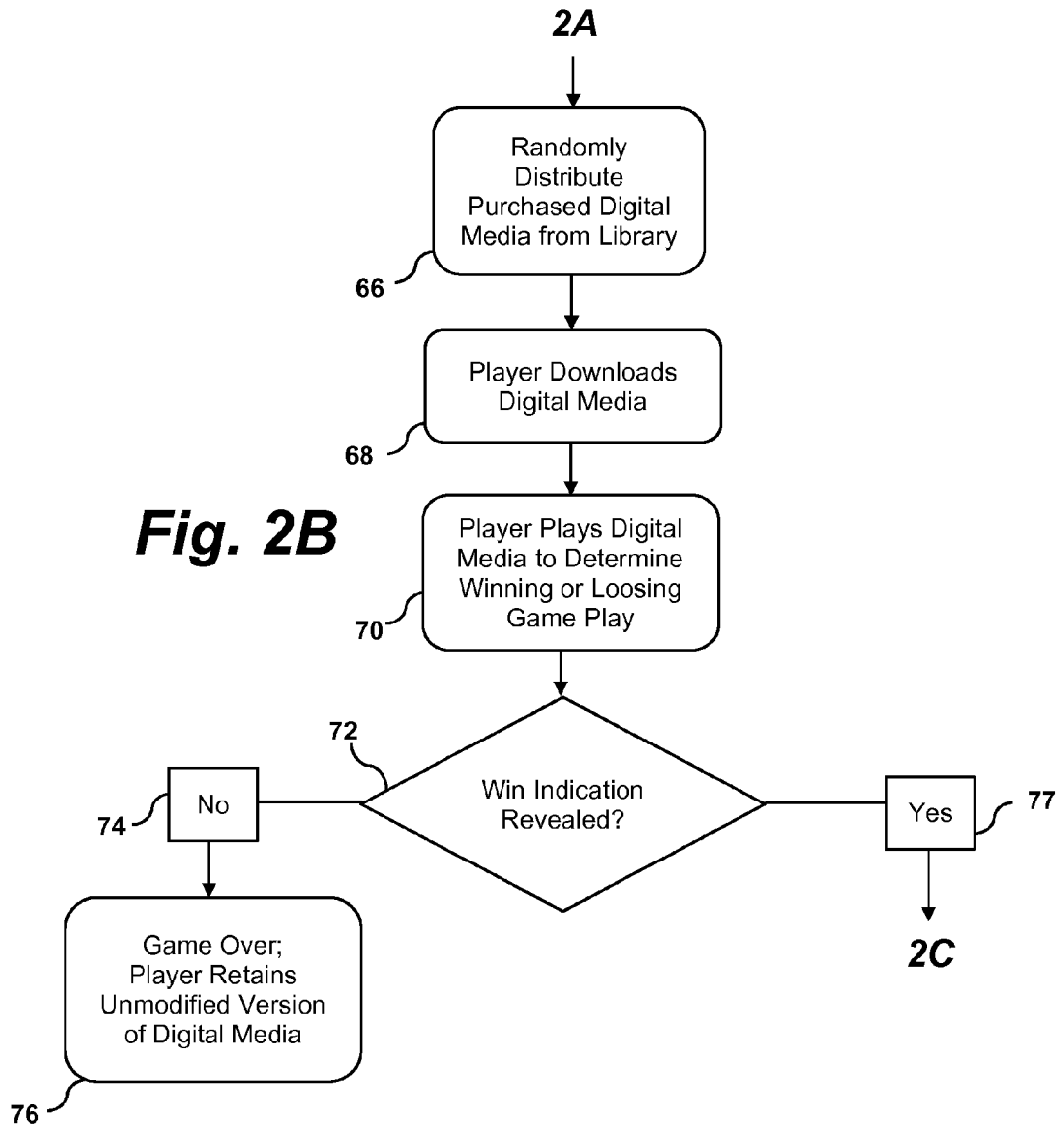
FIG. 2B is a flow diagram of additional aspects of the present method.
Figure 2C:
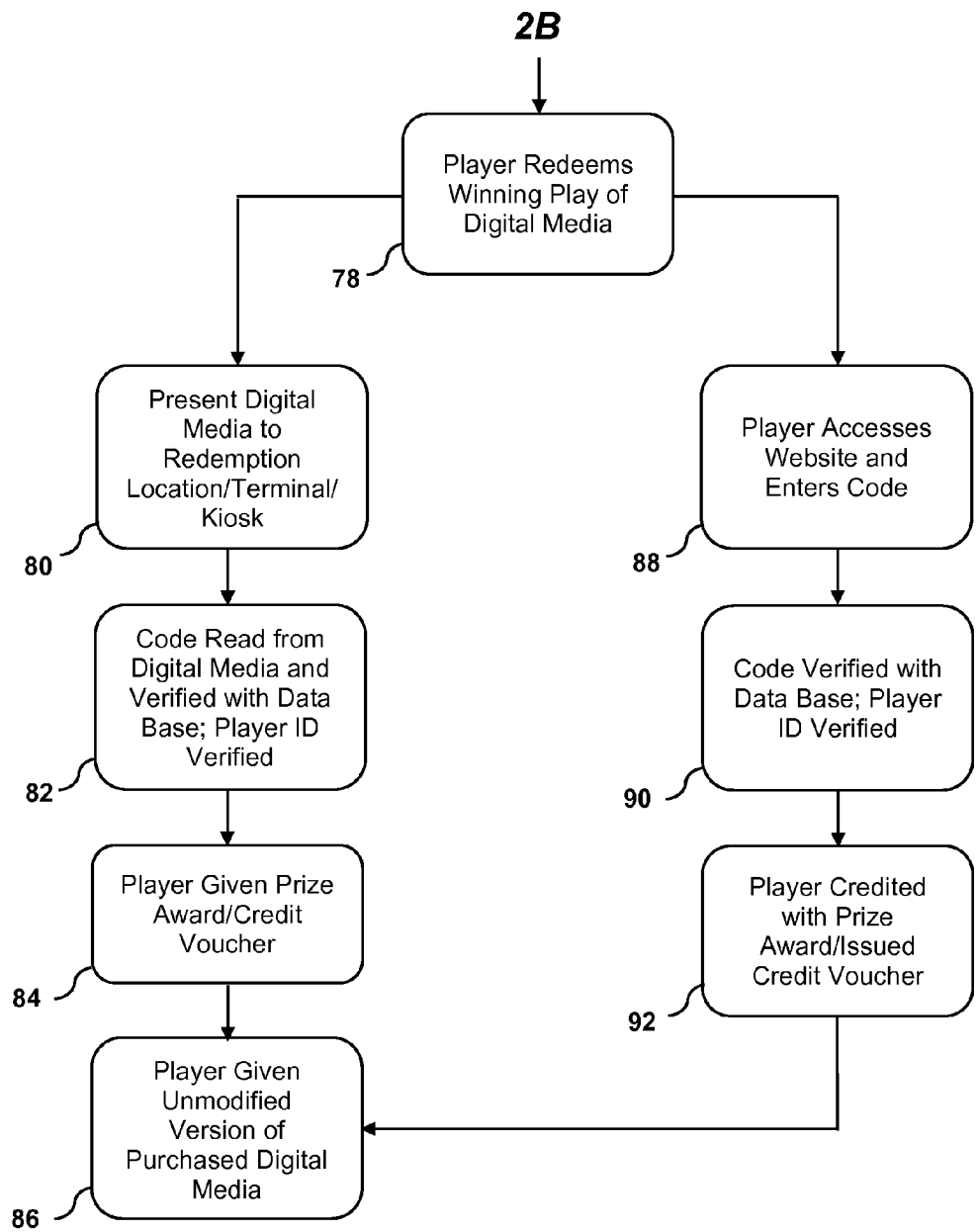
FIG. 2C is a flow diagram or remaining aspects of the present method.

Referring to FIG. 2A, and exemplary methodology is depicted in accordance with aspects of the invention. A lottery authority is identified at step 54. This entity may be a state, jurisdictional, or other governmental entity that sponsors the lottery game. A game provider is identified at step 56. This entity may be a lottery service provider that is contracted by the lottery authority to administer at least certain aspects of the lottery game, such as providing and maintaining the website, obtaining and modifying the digital media, administering and accounting for game plays purchased by players, and so forth. It should be appreciated that the present invention is not meant to be limited by the roles or definitions of these parties, and that the various game functions may be interchanged between the parties, administered by a single party, and so forth. For example, a single party may play the role of game provider and lottery authority in certain embodiments.

Steps 50, 54, and 56 depict the game provider and lottery authority cooperating to define the game parameters, such as game theme, rules of play, expected value, and so forth. The game provider determines the number of songs needed, purchase price to players, odds of winning, and so forth, to achieve the designed expected value for the game. In one embodiment, the game may be played with a single version of digital media, for example, a single song or video. For example, the game may be played with fifty-thousand copies of "Hey Jude" from the Beatles, wherein a defined number of these downloads are modified to be winning game pieces. In an alternate embodiment, the game may be played across a library of different songs by different artists. For example, the game provider may maintain a library of two-hundred thousand songs from different artists, wherein the modified winning game pieces are randomly distributed throughout the library and the expected value is computed for the entire library.

At step 52, the game provider obtains the requisite number of digital media from the owner of the media or an authorized sales/distribution organization that has rights to sell/license the digital media to the game provider, including any permission or rights needed for the game provider to create derivative works by modifying the digital media. As mentioned above, the digital media may include downloadable songs, videos, video games, and the like. The invention is not limited to the type of downloadable digital media.

At step 58, a defined number of digital media are modified to have an auditory or visual indication of a winning lottery play placed in the original format of the digital media. As discussed above, this "modifying" may vary widely within the scope and spirit of the invention, but in general is the step that flags certain of the digital media as winning game pieces. In a particular embodiment, the original format of the digital media is altered to contain the auditory or visual indication of a winning lottery play. For example, if the digital media is a song, the lyrics of the song may be dubbed to say "You are a lottery winner" at an appropriate location within the song. In addition, or alternatively, the original musical score or soundtrack may be altered to include a jingle, bells, or other easily recognized indication of a winning lottery play. In the case of a video or video game, a scene or soundtrack in the video may be altered to provide a visual and/or auditory indication of the winning status of the game piece. For example, in a fight scene in a movie or video game, the victor in the fight may make a visual or auditory indication that the purchaser of the digital media has also won in their quest to be a lottery victor.

Digital editing techniques are well-known, and the invention is not limited to any particular technique for altering the original digital format of the media to include the visual or auditory indication of a winning lottery play. Digital editing allows the modification to be consistent with the theme of the song or video. For example, as mentioned above, the lyrics of a song or soundtrack of a video may be dubbed to indicate a winning lottery play without changing the musical score or composition of the song. Similarly a scene in a video may be digitally altered such that a character in the scene provides a visual or auditory indication of a winning lottery play.

In an alternate embodiment, a separately produced audio or video segment may be produced and digitally embedded into the original lyrics, music, video scene, and so forth, of digital media. This separate segment may have an appearance or sound that is completely unrelated to the theme of the movie or song. For example, the separate track may be an auditory or video banner that is simply embedded in the digital media at an easily noticeable location. The separate segment may be digitally spliced into the song or video, or may replace an original segment of the song or video. The separate segment may play simultaneously with the original song or video, such as a scrolling banner across the bottom of the video screen, or the like.

In a particular embodiment depicted in the present flow diagrams, only the predetermined number of winning digital media are modified. The losing game pieces (digital media) are not modified and remain in their original format. However, the invention also contemplates an embodiment wherein the losing game pieces are also modified from their original format to include an auditory or visual indication of the losing status of the digital media.

The select winning digital media may also be modified at step 58 to include a unique code or serial number at any location within the original piece. This code or serial number is used to authenticate the digital media upon redemption of the media for a prize. The game provider may create a database of the codes or numbers assigned to the particular digital media, including prize amount, title or type of digital media, and any other information or characteristic that the lottery authority or game provider deem necessary for inventory, accounting, redemption of winning digital media, and so forth. In one embodiment, the unique code or number may be provided at the end of the digital media in a visual or auditory format, wherein the visual or auditory modification includes notice to the player to record the code or serial number provided at the end of the piece. Alternatively, the code or serial number may be displayed or played at the same time as the modification that indicates the winning status of the piece.

Instructions are provided to the player as to how to use the code or serial number to redeem their prize. For example, instructions may be given at the time of downloading the digital media, or at the end of play of the digital media, or provide on the lottery website, and so forth.

At step 60, the game provider creates the digital media library, which may include storing the separate pieces of digital media on any suitable storage device for. The modified (winning) digital medial may be randomly distributed throughout the library, wherein the pieces are then retrieved and downloaded in a sequential order. Alternatively, the pieces may be randomly retrieved and downloaded from any location within the library.

At steps 62 and 64, the players are provided with a means for interfacing with the game system to purchase and download the digital media. This step may be accomplished, for example, via a website hosted by a lottery authority/game provider. In an alternative embodiment discussed above with respect to FIG. 1, an establishment authorized by the state or other jurisdiction to conduct the lottery games, such as a convenience store, bar/grill, restaurant, gaming house, casino, and so forth, may include a terminal or kiosk wherein the players (or a clerk) can access the central lottery system and purchase and download the digital media to a personal storage device, such as a flash drive.

Once the purchase transaction is complete, at step 66 a random selection of the particular purchased digital media is retrieved from the digital library and downloaded to the player's storage device at step 68.

At step 70, the player plays the downloaded digital media at a time of their choosing. At step 72, the player listens to or views the piece to determine if they have purchased a winning digital media (game piece) in the lottery game, as indicated by an auditory or visual modification made to the original format of the piece, as described above. If the downloaded digital media is unmodified (i.e., does not contain a winning auditory or visual indication) at step 74, then the game play is over as to that particular digital media game piece and the player remains in possession of an unmodified version of the digital media in its original format (step 76) as a consolation.

If the downloaded digital media contains an auditory or visual win indication at step 77, then the player may proceed to redeem their winning play for a prize award associated with the unique code or serial number assigned to the respective digital media. This may be done in various ways. For example, the player may be instructed to present the digital media on a storage device (e.g., a flash drive) to a local redemption location at step 80, which may be a point-of-sale (POS) location having a terminal or kiosk configured for sale and download of the digital media, as discussed above. A clerk at the POS location, or attendant at the redemption location, may then enter the code at step 82 into the terminal or other device that is in communication with the lottery authority/game provider central system for authenticating and verifying the presented digital media for redemption of the prize award. Once redeemed, the code is flagged as "paid" in the database so that subsequent attempts to redeem the same digital media (or copies thereof) are thwarted. Other verification steps may also be taken at step 82, for example, the players identification, age, residence, etc., may also be verified.

At step 84, the player awarded the associated prize award in the form of any suitable tender. For example, the player may be issued a cash award, a credit voucher for cash, merchandise, or other type of award, and so forth.

At step 86, it may be desired to also provide the player with an unmodified (e.g., "clean") version of their purchased digital media. For example, if the player purchased a song, they may be given a download (or voucher for same) of the song in its original format without indication of a winning play.

In an alternate redemption scenario, the player may be instructed to access the lottery website at step 88 in order to enter the unique code or serial number. This scenario is likely when the download was initially purchased through the website instead of via a terminal or kiosk at a POS. At step 90, the entered code is verified with the database by the lottery central system. Other verification or authentication steps may also be taken, such as having the player confirm their identity, age, or residence via the website. In situations wherein the player has established an Internet-based player account accessible via the website, the player may be required to verify that they are the owner of the account.

Once the requisite verification/authentication steps are satisfied, the player is credited with the associated prize award at step 92, which may be a credit to the player's account, a printed voucher to collect a cash award at a redemption location, or any other suitable redemption scenario. As above, the player may also be given a clean, unmodified version of their downloaded digital media.

As mentioned, the present invention also encompasses a digital media-based award system for use in any type of gaming environment wherein prizes or awards are given in a game of chance or skill. The digital media may be a component of the game, such as the lottery game pieces described above, or may be the prize associated with another game, such as a raffle, slot machine award, any type of game wherein players earn credits and trade such credits for a prize, including second chance games. Such games may require the player to pay an additional price for the chance of obtaining a winning status digital media, or the price may be built into the original game in which credits or points were earned to "purchase" the digital media.

Figure 3:
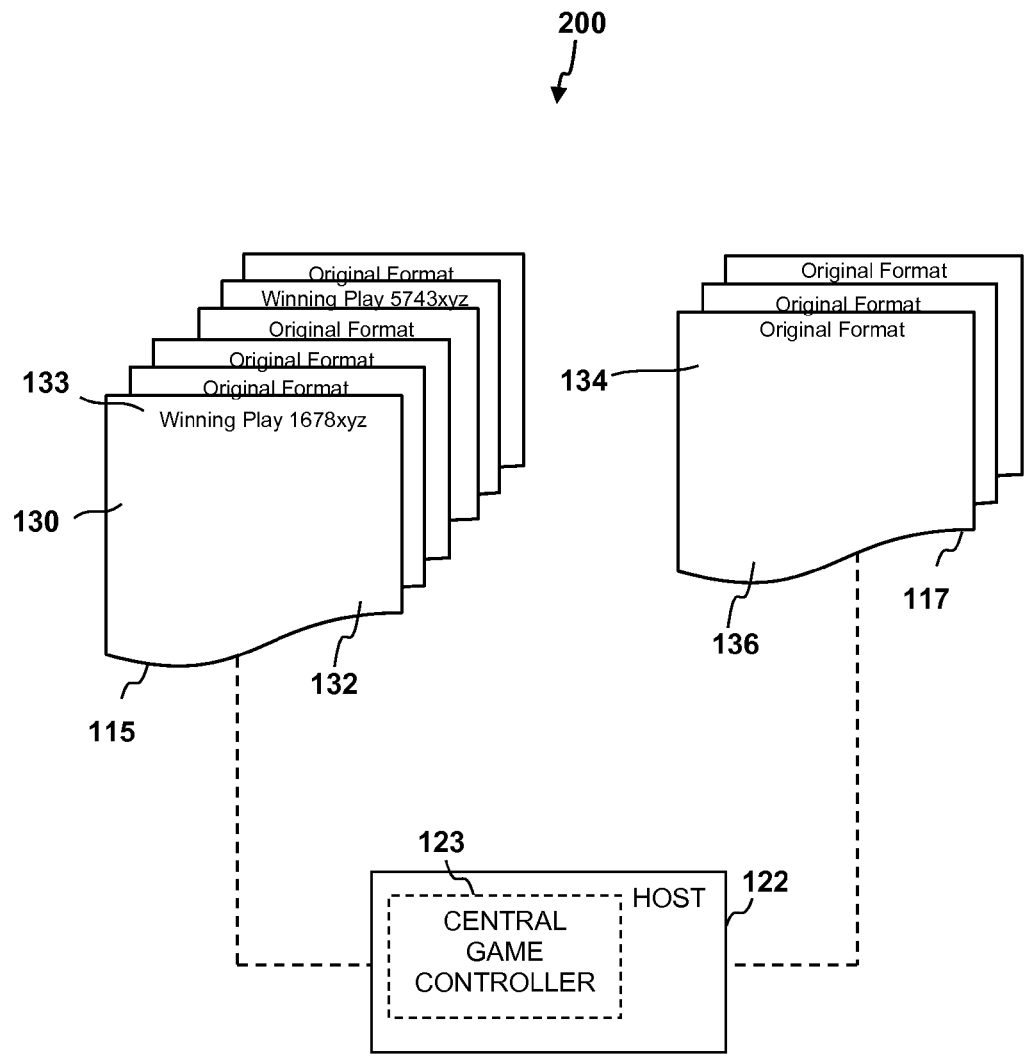
FIG. 3 is a schematic view of a library of digital media including modified media and additional digital media in original format.

FIG. 3 depicts aspects of an award system 200 that includes a library 115 of individual digital media 130. The library 115 may be stored in any suitable storage medium and is accessible by the central game system 122, in particular the central game controller 123, as discussed above. Certain ones of the digital media 130 are winning digital media 132 that contain the modification of their original format to include a winning status indication. These digital media 132 may also include a unique serial number or code 133 for the purposes described above. A second compilation or library 117 of digital media 136 may also be accessible to the system 122. These media 136 correspond to the winning status digital media 132 in the library 115 in their original respective format (e.g., unmodified). Upon redemption of one of the winning status digital media 132, the player may also be give a download of the "clean" version 136 of their winning status digital media, as discussed above.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method for integrating game products with sale and dissemination of digital media to players, comprising:

providing for players to purchase digital media for download at a purchase price;

the purchase price entering the player into a game wherein the digital media Purchased and downloaded to the player determines whether or not the player has won in the game;

maintaining a library of the digital media from which the digital media purchased and downloaded to the player are obtained, each of the digital media in the library having an identical visual or audio original commercial format corresponding to a publicly available song or video that is unrelated to play of the game and separately commercially available to the players and to non-players of the game;

modifying a defined number of the digital media in the library to have an auditory or visual indication of a winning game play placed in the original commercial format of the digital media, wherein a winning status is revealed by visual or audio playback of the digital media;

wherein players download and listen to or view the digital media to determine if they have purchased a winning version of the digital media from the library of the digital media;

wherein the digital media downloaded to the player is randomly selected from the library of the digital media;

wherein a winning outcome of the digital media is predetermined and contained in the digital media before players are provided individual ones of the digital media;

wherein losing versions of the digital media in the library are not modified from their original commercial format such that layers losing in the game are provided the digital media in its original commercial format; and wherein, in the digital media that are modified, the original commercial format of the digital media is altered to contain the auditory or visual indication of the winning game play.

2. The method as in claim 1, wherein the alteration includes a change in lyrics to the song or change to a scene in the video such that the alteration compliments a theme of the original commercial format of the song or the video.

3. The method as in claim 1, wherein a separately produced segment that contains the auditory or visual indication is embedded into the original commercial format of the digital media to indicate the winning status.

4. The method as in claim 3, wherein the separately produced segment interrupts lyrics to the song or a scene in the video of the digital media.

5. The method as in claim 1, wherein the game product is a lottery-based game product and a website is hosted by a lottery authority, the lottery authority obtaining the library of digital media from an owner or authorized source of the digital media with rights to sell and distribute the digital media to players and with rights to modify a defined number of the digital media from their original commercial format to include the indication of a winning lottery play.

6. The method as in claim 1, wherein the game has an expected value (EV), and wherein the purchase price, the defined number of the digital media that are modified, and prize awards in the game are selected to achieve the expected value.

7. The method as in claim 1, wherein the library of the digital media are downloadable music/songs, the auditory or visual indication of the winning game play including a modification to words or musical composition of the original commercial format of the music/song.

8. The method as in claim 1, wherein the library of the digital media are downloadable videos, the auditory or visual indication of a winning game play including a modification to the soundtrack or visual composition of the original commercial format of the video.

9. The method as in claim 8, wherein the downloadable videos are video games, wherein an event in the video games is modified from its original commercial format to indicate the winning game play.

10. The method as in claim 1, further comprising providing to winners of the game an additional download of the digital media purchased by the player in the original commercial format of the digital media.

11. The method as in claim 1, comprising providing for players to access a website via a network enabled device, wherein the website offers to the players the digital media for download at the purchase price.

12. The method as in claim 1, comprising providing for players to purchase the digital media for download at a point of sale retail location.

13. The method as in claim 12, wherein a stand-alone kiosk or terminal is provided at the point of sale retail location for sale of the digital media.

14. The method as in claim 1, wherein the auditory or visual indication of the winning game play in the digital media includes identification of a prize award associated with the winning game play.

15. The method as in claim 1, wherein each of the digital media in the library of the digital media that is modified is assigned a unique code or serial number associated with a respective prize award.

16. The method as in claim 15, wherein the auditory or visual indication of the winning game play in the digital media includes the unique code or serial number, wherein the player accesses a website hosted by a gaming authority and enters the unique code or serial number to learn the prize award and instructions for redeeming the winning game play to collect the prize award.

17. The method as in claim 15, wherein the auditory or visual indication of the winning game play in the digital media includes the unique code or serial number, wherein the player presents the digital media for reading of the unique code or serial number to redeem the winning game play and collect the prize award.

18. The method as in claim 15, wherein the auditory or visual indication of the winning game play in the digital media includes the unique code or serial number, wherein the player presents the unique code or serial number to an authorized game redemption location to redeem the winning game play and collect the prize award.

* * * * *